(12) United States Patent
Li et al.

(10) Patent No.: US 10,950,255 B2
(45) Date of Patent: Mar. 16, 2021

(54) AUDIO FINGERPRINT EXTRACTION METHOD AND DEVICE

(71) Applicant: Beijing Bytedance Network Technology Co., Ltd., Beijing (CN)

(72) Inventors: Gen Li, Beijing (CN); Lei Li, Beijing (CN); Yi He, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 16/652,028

(22) PCT Filed: Dec. 29, 2018

(86) PCT No.: PCT/CN2018/125491
§ 371 (c)(1),
(2) Date: Mar. 27, 2020

(87) PCT Pub. No.: WO2019/184517
PCT Pub. Date: Oct. 3, 2019

(65) Prior Publication Data
US 2020/0273483 A1    Aug. 27, 2020

(30) Foreign Application Priority Data
Mar. 29, 2018   (CN) ........................ 201810273669.6

(51) Int. Cl.
*G10L 25/51*      (2013.01)
*G10L 25/18*      (2013.01)
(Continued)

(52) U.S. Cl.
CPC ............ *G10L 25/51* (2013.01); *G06F 16/683* (2019.01); *G10L 25/18* (2013.01); *G10L 25/21* (2013.01)

(58) Field of Classification Search
CPC . G06F 3/16; G06F 3/162; G06F 3/165; G06F 3/167; G06F 16/40; G06F 16/41;
(Continued)

(56) References Cited

U.S. PATENT DOCUMENTS 9,798,513 B1 *   10/2017  Pereira ................... G06F 3/165
10,236,006 B1 *   3/2019  Gurijala ................. G10L 19/06
(Continued)

FOREIGN PATENT DOCUMENTS

CN       101663708 A     3/2010
CN       103999473 A     8/2014
(Continued)

OTHER PUBLICATIONS

International Patent Application No. PCT/CN2018/125491; Int'l Search Report; dated Mar. 20, 2019; 2 pages.

*Primary Examiner* — Andrew C Flanders
(74) *Attorney, Agent, or Firm* — BakerHostetler

(57) ABSTRACT

An audio fingerprint extraction method and device are provided. The method includes: converting an audio signal to a spectrogram; determining one or more characteristic points in the spectrogram; in the spectrogram, determining one or more masks for the characteristic points; determining mean energy of each of the spectrum regions; determining one or more audio fingerprint bits according to mean energy of the plurality of spectrum regions in the one or more masks; judging credibility of the audio fingerprint bits to determine one or more weight bits; and combining the audio fingerprint bits and the weight bits to obtain an audio fingerprint. Each of the one or more masks includes a plurality of spectrum regions.

18 Claims, 5 Drawing Sheets

(51) Int. Cl.
*G10L 25/21* (2013.01)
*G06F 16/683* (2019.01)

(58) Field of Classification Search
CPC ...... G06F 16/43; G06F 16/432; G06F 16/433;
G06F 16/438; G06F 16/44; G06F 16/45;
G06F 16/48; G06F 16/483; G06F 16/489;
G06F 16/60; G06F 16/61; G06F 16/63;
G06F 16/632; G06F 16/634; G06F
16/638; G06F 16/64; G06F 16/65; G06F
16/68; G06F 16/683; G06F 16/685; G06F
16/686; G06F 16/70; G06F 16/71; G06F
16/73; G06F 16/732; G06F 16/738; G06F
16/74; G06F 16/75; G06F 16/78; G06F
16/783; G06F 16/7834; G06F 16/7867;
G10L 25/51; G10L 25/18; G10L 25/21;
G10L 25/24; G10L 25/54; G10L 17/02;
G10L 19/08; G10H 2210/031; G10H
2210/061; G10H 2240/141; G10H
2240/151; G06K 9/00711; G06K
9/00718; G06K 9/00744; G06K 9/00751
See application file for complete search history.

(56) References Cited

U.S. PATENT DOCUMENTS

| | | | | |
|---|---|---|---|---|
| 10,360,905 | B1* | 7/2019 | Pereira | G06K 9/3266 |
| 2002/0083060 | A1* | 6/2002 | Wang | G10L 17/26 |
| 2005/0249080 | A1* | 11/2005 | Foote | G06F 16/634 |
| | | | | 369/59.1 |
| 2006/0031381 | A1 | 2/2006 | Van Luijit et al. | |
| 2007/0055500 | A1* | 3/2007 | Bilobrov | G10L 19/018 |
| | | | | 704/217 |
| 2011/0276157 | A1* | 11/2011 | Wang | H04N 21/8549 |
| | | | | 700/94 |
| 2012/0209612 | A1* | 8/2012 | Bilobrov | G10L 25/54 |
| | | | | 704/270 |
| 2013/0091167 | A1* | 4/2013 | Bertin-Mahieux | G06F 16/683 |
| | | | | 707/769 |
| 2013/0152767 | A1* | 6/2013 | Katz | G10H 1/00 |
| | | | | 84/616 |
| 2013/0259211 | A1* | 10/2013 | Vlack | G06F 16/683 |
| | | | | 379/88.01 |
| 2014/0142958 | A1* | 5/2014 | Sharma | G10L 19/02 |
| | | | | 704/500 |
| 2014/0180674 | A1* | 6/2014 | Neuhauser | G10H 1/0008 |
| | | | | 704/9 |
| 2014/0188487 | A1* | 7/2014 | Perez Gonzalez | G10L 19/00 |
| | | | | 704/500 |
| 2014/0280265 | A1* | 9/2014 | Wang | H04H 60/37 |
| | | | | 707/758 |
| 2014/0330556 | A1* | 11/2014 | Resch | G10H 1/0008 |
| | | | | 704/221 |
| 2017/0097992 | A1* | 4/2017 | Vouin | G10L 25/51 |
| 2019/0387273 | A1* | 12/2019 | Stojancic | H04N 1/32 |
| 2020/0265864 | A1* | 8/2020 | Markovic | G10L 25/21 |

FOREIGN PATENT DOCUMENTS

| | | |
|---|---|---|
| CN | 104050259 A | 9/2014 |
| CN | 107622773 A | 1/2018 |
| JP | 2005-534098 A | 11/2005 |
| JP | 2012-185195 A | 9/2012 |
| JP | 2015-515646 A | 5/2015 |
| JP | 2016-133600 A | 7/2016 |
| WO | WO 2013/008956 A1 | 1/2013 |

* cited by examiner

AUDIO FINGERPRINT EXTRACTION METHOD AND DEVICE

CROSS-REFERENCE TO RELATED APPLICATIONS

The application is the national phase application of International Patent Application No. PCT/CN2018/125491, titled "AUDIO FINGERPRINT EXTRACTION METHOD AND DEVICE", filed on Dec. 29, 2018, which claims priority to Chinese Patent Application No. 201810273669.6 filed on Mar. 29, 2018, the entire contents of both of which are incorporated herein by reference.

TECHNICAL FIELD

The disclosure relates to an audio process technology, in particular to an audio fingerprint extraction method and device.

BACKGROUND ART

An audio fingerprint (or called an audio feature) and audio fingerprint retrieval are widely applied in the current "multimedia information society". The audio fingerprint retrieval is firstly applied to music listening for song searching, i.e., a piece of audio is input, and the fingerprint feature of the audio is extracted and compared to recognize a corresponding song. In addition, the audio fingerprint retrieval can also be applied to content monitoring, such as audio repetition removal, voice advertisement monitoring based on retrieval, audio copyright and the like.

A conventional audio fingerprint search method has the problem of poor accuracy to some extent due to poor accuracy of the extracted audio fingerprint. The conventional audio fingerprint extraction method suffers problems such as the poor robustness with respect to noises and complex processes.

SUMMARY

An objective of the disclosure is to provide a new audio fingerprint extraction method and device.

The objective of the disclosure is achieved by adopting the technical solution as follows. An audio fingerprint extraction method provided by the disclosure includes following steps: converting an audio signal to a spectrogram; determining one or more characteristic points in the spectrogram; in the spectrogram, determining one or more masks for the one or more characteristic points; determining mean energy of each of the plurality of spectrum regions; determining one or more audio fingerprint bits according to the mean energy of the plurality of spectrum regions in the one or more masks; judging credibility of the one or more audio fingerprint bits to determine one or more weight bits; and combining the one or more audio fingerprint bits and the one or more weight bits to obtain an audio fingerprint. Each of the one or more masks comprise a plurality of spectrum regions.

The objective of the disclosure can further employ the following technology to be achieved.

In the foregoing audio fingerprint extraction method, the process of converting an audio signal to a spectrogram comprises: converting the audio signal to a two-dimensional time-frequency spectrogram by fast Fourier transformation; wherein a value of each point in the spectrogram indicates energy of the audio signal.

In the foregoing audio fingerprint extraction method, the process of converting an audio signal to a spectrogram further comprises: processing the spectrogram by MEL transformation.

In the foregoing audio fingerprint extraction method, the process of converting an audio signal to a spectrogram further comprises: processing the spectrogram by human auditory system filtering.

In the foregoing audio fingerprint extraction method, each of the one or more characteristic points is a fixed point in the spectrogram.

In the foregoing audio fingerprint extraction method, each of the one or more characteristic points is a point whose frequency is equal to one of a plurality of pre-set frequency values.

In the foregoing audio fingerprint extraction method, each of the one or more characteristic points is a maximal energy point in the spectrogram, or each of the one or more characteristic points is a minimal energy point in the spectrogram.

In the foregoing audio fingerprint extraction method, the plurality of spectrum regions comprised in the one or more masks are symmetrical distributed.

In the foregoing audio fingerprint extraction method, the plurality of spectrum regions comprised in the one or more masks have an identical frequency range, and/or an identical time range, and/or are centrosymmetric with the characteristic point as a center.

In the foregoing audio fingerprint extraction method, the mean energy of each of the plurality of spectrum regions is a mean value of energy values of all points comprised in the spectrum region.

In the foregoing audio fingerprint extraction method, the process of determining one or more audio fingerprint bits according to mean energy of the plurality of spectrum regions in the one or more masks comprises: determining one of the one or more audio fingerprint bits according to a difference value of the mean energy of the plurality of spectrum regions comprised in one mask.

In the foregoing audio fingerprint extraction method, the process of judging credibility of the one or more audio fingerprint bits to determine one or more weight bits comprises: judging whether an absolute value of the difference value attains or exceeds a pre-set weight bit threshold, if it attains or exceeds the pre-set weight bit threshold, determining the audio fingerprint bit to be a strong bit, otherwise determining the audio fingerprint bit to be a weak bit; determining the weight bit according to the audio fingerprint bit is the strong bit or the weak bit.

In the foregoing audio fingerprint extraction method, the weight bit threshold is a fixed value, or a value based on the difference value, or a scale value.

In the foregoing audio fingerprint extraction method, the audio fingerprint extraction method further comprises: dividing the audio signal into a plurality of audio sub-signals according to time; extracting the audio fingerprints of the plurality of audio sub-signals; and combining the audio fingerprints of the plurality of audio sub-signals to obtain the audio fingerprint of the audio signal.

The objective of the disclosure is further achieved by adopting the technical solution as follows. An audio fingerprint library construction method provided by the disclosure includes extracting an audio fingerprint of an audio signal according to any of the audio fingerprint extraction method described above; and storing the audio fingerprint in an audio fingerprint library.

The objective of the disclosure is further achieved by adopting the technical solution as follows. An audio fingerprint extraction device provided by the disclosure includes a spectrogram converter configured for converting an audio signal to a spectrogram; a characteristic point determiner configured for determining a characteristic point in the spectrogram; a mask determiner configured for determining one or more mask for the spectrogram in the spectrogram; a mean energy determiner configured for determining mean energy of each of the plurality of spectrum regions; an audio fingerprint determiner configured for determining an audio fingerprint bit according to mean energy of the plurality of spectrum regions in the one or more mask; a weight bit determiner configured for judging credibility of the audio fingerprint bit to determine a weight bit; and an audio fingerprint determiner configured for combining the audio fingerprint bit and the weight bit to obtain an audio fingerprint. Each of the one or more masks comprises a plurality of spectrum regions.

The objective of the disclosure is further achieved by adopting the technical solution as follows.

The foregoing audio fingerprint extraction device further includes a module executing steps of any audio fingerprint extraction method described above.

The objective of the disclosure is further achieved by adopting the technical solution as follows. An audio fingerprint library construction device provided by the disclosure includes an audio fingerprint extractor configured for extracting an audio fingerprint of an audio signal according to any audio fingerprint extraction method described above; an audio fingerprint memory configured for storing the audio fingerprint in an audio fingerprint library; and the audio fingerprint library configured for storing the audio fingerprint.

The objective of the disclosure is further achieved by adopting the technical solution as follows. An audio fingerprint extraction hardware device provided by the disclosure includes a memory configured for storing non-transitory computer readable instructions and a processor configured for executing the non-transitory computer readable instructions to implement any audio fingerprint extraction method described above.

The objective of the disclosure is further achieved by adopting the technical solution as follows. According to a computer readable storage medium configured for storing non-transitory computer readable instructions provided by the disclosure, when the non-transitory computer readable instructions are executed by a computer, the computer executes any audio fingerprint extraction method described above.

The objective of the disclosure is further achieved by adopting the technical solution as follows. A terminal device provided by the disclosure includes any audio fingerprint extraction device described above.

The illustration above only is the overview of the technical solution of the disclosure. In order to clearly describe the technological solutions of the disclosure and follow the specification, as well as better understanding the aforementioned and other objectives, features and advantages of the disclosure, preferred embodiments with drawings thereof will be explained in detail as follows.

DETAILED DESCRIPTION

In order to further illustrate technological means adopted by the disclosure for acquiring an expected objective and effects, concrete embodiments, structures, features and effects of the audio fingerprint extraction method and device provided according to the disclosure will be illustrated in detail with reference to preferred embodiments and drawings thereof as follows.

Figure 1:
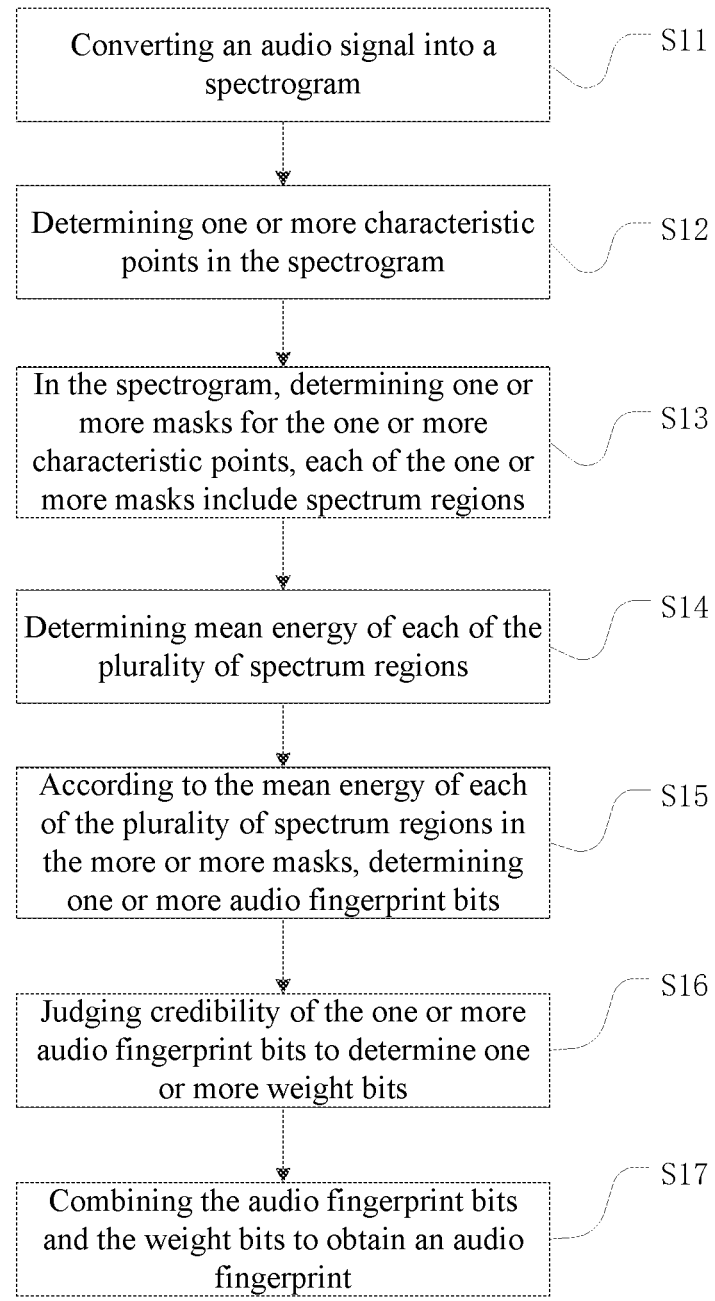
FIG. 1 is a schematic flowchart of an audio fingerprint extraction method of an embodiment of the disclosure.

FIG. 1 is a schematic flowchart of an audio fingerprint extraction method of an embodiment of the disclosure. Referring to FIG. 1, the audio fingerprint extraction method of the embodiment of the disclosure primarily includes following steps.

Step S11, an audio signal is converted to a spectrogram. Specifically, the audio signal is converted to a time-frequency spectrogram by the fast Fourier transformation. The spectrogram is a common two-dimensional spectrogram of audio signals. An abscissa axis is the time t, and a vertical axis is the frequency f. A specific value $E(t, f)$ of each point in the spectrogram indicates signal energy. It is noted that the audio signal is not restricted to a specific type, which can be a static file or streaming audio. Then the process will advance to the step S12.

In embodiments of the disclosure, the spectrogram can be processed by the MEL transformation. The spectrogram can be divided into multiple bins by the MEL transformation, and the amount of divided frequency bins can be deployed. Moreover, the spectrogram can further be processed by the human auditory system filtering, which utilizes nonlinear transformations such as the human auditory system filtering to better fit the spectral distribution in the spectrogram and the ear perception.

It is clarified that different practical situations can be adapted by adjusting each hyper-parameter in the fast Fourier transformation. In embodiments of the disclosure, each of hyper-parameters in step S11 can be disposed as follows. In the fast Fourier transformation, a time window is 100 ms; an interval is 50 ms; in the MEL transformation, the quantity of frequency bins is 32~28.

Step S12, one or more characteristic points in the spectrogram are determined.

Specifically, one of numerous standards is employed to determine the one or more characteristic points. For instance, the characteristic point can be a maximal energy point in the spectrogram, or a minimal energy point in the spectrogram. If energy $E(t, f)$ of a point $(t, f)$ in the spectrogram can simultaneously satisfy $E(t, f) > E(t+1, f)$, $E(t, f) > E(t-1, f)$, $E(t, f) > E(t, f+1)$ and $E(t, f) > E(t, f-1)$, the point $(t, f)$ is the maximal energy point in the spectrogram. Similarly, if energy $E(t, f)$ of a point $(t, f)$ can simultaneously satisfy E(t, f)<E(t+1, f), E(t, f)<E(t−1, f), E(t, f)<E(t, f+1) and E(t, f)<E(t, f−1), the point (t, f) is the minimal energy point in the spectrogram. Then the process will advance to step S13.

In embodiments of the disclosure, selecting extreme energy points as the characteristic points brings problems; for instance, the extreme energy points are susceptible; the amount of extreme energy points is uneasy to control; it is possible that no extreme energy point exists in one spectrogram, but multiple extreme energy points exist in another spectrogram, which can render the characteristic points to be uneven; additional timestamps need to be stored for recording positions of the extreme energy points in the spectrogram. Therefore, the characteristic points can be a fixed point other than the extreme energy points, such as a point whose frequency is equal to a presupposed frequency value (a point with a fixed frequency). Furthermore, numerous frequency values of low frequency, intermediate frequency and high frequency can be presupposed based on frequency values; concrete values of the low frequency, intermediate frequency and high frequency can be disposed. Selected characteristic points can be more homogeneous by picking various fixed points with low frequency, intermediate frequency and high frequency as the characteristic points. It is noted that the fixed points can be selected according to other criterions, such as a point equal to one or more pre-set energy values.

It is necessary to illustrate that the number of selected characteristic points can be adjusted to accommodate diverse practical conditions. In embodiments of the disclosure, hyper-parameters in step S12 can be disposed as follows. A density of the characteristic points is disposed to be 20~80 per second.

Step S13, in the spectrogram, around the characteristic points, one or more masks can be determined for the characteristic points. Each mask includes or covers multiple regions on the spectrogram, which can be called spectrum regions. Then the process will advance to step S14.

Specifically, in the spectrogram, multiple spectrum regions contained in each mask can be symmetrically distributed, such as symmetry over a timeline, namely multiple spectrum regions have the same frequency range, or symmetry over a frequency axis, namely multiple spectrum regions have the same time range, or centrosymmetric distribution with the characteristic point as a center.

For instance, in a MEL-spectrogram, a mask containing two spectrum regions of R11 and R12 can be determined for the characteristic point. R11 and R12 locate at the left side of the characteristic point, and R11 locates at the left side of R12. R11 and R12 cover the same frequency bin.

For instance, in a MEL spectrogram, a mask containing two spectrum regions of R13 and R14 can be determined for the characteristic point. R13 locates at the upside of the characteristic point, and R14 locates at the downside of the characteristic point. R13 and R14 have the same time range.

For instance, in a MEL spectrogram, a mask containing two spectrum regions of R15 and R16 can be determined for the characteristic point. R15 locates at the upper left of the characteristic point, and R16 locates at the right lower side of the characteristic point. R15 and R16 are mutually symmetrical with the characteristic point as a center.

Multiple spectrum regions contained in a mask can simultaneously satisfy numerous symmetrical situations. For instance, a mask containing four spectrum regions of R21, R22, R23 and R24 can be determined for the characteristic point. R21, R22, R23 and R24 respectively locate at upper left, upper right, left lower, right lower side. R21 and R22 have the same frequency range; R23 and R24 have the same frequency range; R21 and R23 have the same time range; R22 and R24 have the same time range. The four spectrum regions further are centrosymmetric with the characteristic point as a center. It is necessary to clarify than four spectrum regions of a mask are not obligatory to be centrosymmetric with the characteristic point as a center. For instance, they can locate at the left side of the characteristic point, and distribute at two sides of the characteristic point in the frequency axis.

It is necessary to be expressed that multiple spectrum regions belonging to one mask can be mutually overlapped. Moreover, different masks can further be mutually overlapped. Optionally, each mask can include even numbered spectrum regions.

It needs to note that masks can be determined according to a fixed pre-set standard, namely the position and the cover region of each mask in the spectrogram are pre-set. Or the mask region can be automatically determined by a data driving manner rather than pre-setting the position and region of each mask. A mask with the minimal covariance is selected from a large amount of masks, which is the most distinguishing.

Step 14, mean energy of each spectrum region is determined. Specially, regarding a spectrum region merely including one point, the mean energy of the spectrum region is the energy value of the point; when the spectrum region is formed by multiple points, the mean energy of the spectrum region can be disposed to be a mean value of energy values of the points. Then the process will advance to step S15.

Step S15, according to the mean energy of the multiple spectrum regions in the one or more masks, one or more audio fingerprint bits are determined. Then the process will advance to step S16.

In step S15 of an embodiment of the disclosure, the audio fingerprint bit can be determined according to a difference value of mean energy of multiple spectrum regions included in one mask.

Specifically, if a mask includes two spectrum regions, such as the foregoing example including two spectrum regions of R11 and R12, a difference value D1 of mean energy of R11 and R12 can be calculated according to the formula one below.

$$D1 = E(R11) - E(R12) \quad \text{(formula one)}$$

Then the difference value D1 is judged. If the difference value D1 is a positive value, an audio fingerprint bit whose value is 1 will be obtained; if the difference value D1 is a negative value, an audio fingerprint bit whose value is 0 will be obtained.

If a mask includes four spectrum regions, such as the example including four spectrum regions of R21, R22, R23 and R24 described above, a difference value D2 of mean energy of R21, R22, R23 and R24 can be calculated according to formula two as below.

$$D2 = (E(R21) + E(R22)) - (E(R23) + E(R24)) \quad \text{(formula two)}$$

Then the difference value D2 is judged. If the difference value D2 is a positive value, an audio fingerprint bit whose value is 1 will be obtained; if the difference value D1 is a negative value, an audio fingerprint bit whose value is 0 will be obtained. It needs to be illustrated that other forms of difference values than the difference value D2 can be utilized to determine the audio fingerprint bit of a mask including four spectrum regions. For instance, a second order difference value D3 of mean energy of the four spectrum regions can further be calculated.

$$D3=(E(R23)-E(R24))-(E(R21)-E(R22))$$ (formula three)

Then the audio fingerprint bit can be determined by judging the difference value is positive or negative.

It needs to clarify that if multiple masks are determined for the characteristic point, multiple audio fingerprint bits can be obtained correspondingly.

Step 16, one or more weight bits corresponding to the one or more audio fingerprint bits are determined. The one or more weight bits are configured for indicating credibility of the one or more audio fingerprint bits. Specifically, an audio fingerprint bit with high credibility is defined as a strong bit, and an audio fingerprint bit with low credibility is defined as a weak bit. The credibility of the audio fingerprint bit is judged, and a value of the weight bit is determined by judging the audio fingerprint bit is a strong bit or a weak bit. Then the process will advance to step S17.

In an embodiment of the disclosure, if an audio fingerprint bit is determined according to the difference value of mean energy of multiple spectrum regions included in the mask, the step S16 specifically includes judging if an absolute value of the difference value used to generate the audio fingerprint bit attains or exceeds a presupposed weight bit threshold; if it attains the weight bit threshold, the audio fingerprint bit is determined to be a strong bit, and acquires a weight bit whose value is 1 corresponding to the audio fingerprint bit; if it fails to attain the weight bit threshold, the audio fingerprint bit is determined to be a weak bit, and acquires a weight bit whose value is 0 corresponding to the audio fingerprint bit.

As a concrete example, if an audio fingerprint bit is determined by judging the difference value D2 of mean energy of four spectrum regions of aforementioned formula two is positive or negative, the step S16 will include judging a relation between an absolute value of the difference value D2 and a pre-set weight bit threshold T, if |D2|T, the audio fingerprint bit is a strong bit, and a value of the weight bit corresponding to the audio fingerprint bit is set to be 1; if |D2|<T, the audio fingerprint bit is a weak bit, and a value of the weight bit corresponding to the audio fingerprint bit is set to be 0. It needs to clarify that the weight bit threshold can be various types of thresholds. The weight bit threshold can be a pre-set fixed value, such as 1; or the weight bit threshold can further be a value obtained based on the difference value of mean energy. For instance, the weight bit threshold can be set to be a mean value of multiple difference values corresponding to numerous masks or characteristic points; actually, it is unrestricted to the mean value, any value between the maximal difference value and the minimal difference can be available. An audio fingerprint bit of the difference value attaining the mean value is determined to be a strong bit; an audio fingerprint bit of the difference value failing to attain the mean value is determined to be a weak bit; or the weight bit threshold can further be a scale value. For instance, the weight bit threshold can be set to be 60%. Among various difference values corresponding to multiple masks or characteristic points, if an absolute value of one difference value is top 60% of all the difference values, the audio fingerprint bit is determined to be a strong bit; or else the audio fingerprint bit is determined to be a weak bit.

Step S17, the obtained one or more audio fingerprint bits and one or more weight bits are combined to obtain the audio fingerprint. Specifically, the combination manner and the length of audio fingerprints will not be limited. For instance, one audio fingerprint can include two sections. One section is an audio fingerprint bit sequence obtained by combining audio fingerprint bits corresponding to all masks of a characteristic point; several audio fingerprint bit sequences corresponding to multiple characteristic points are arranged according to time of the characteristic points to obtain the first section of the audio fingerprint; the other section is combining corresponding weight bits to obtain weight bit sequences with a length equal to that of the audio fingerprint bit sequence; then multiple weight bit sequences corresponding to several characteristic points are arranged according to the time of characteristic points to obtain the second section of the audio fingerprint. Optionally, a length of the obtained audio fingerprint bit sequence can be 32 bits.

The disclosure simultaneously extracts the audio fingerprint bit and the weight bit corresponding to the fingerprint bit, which can generate an audio fingerprint with high accuracy and excellent robustness for a section of audio.

Optionally, the audio fingerprint extraction method further includes adding a timestamp field, which can be a field configured for depicting a time difference of a starting position of the audio and the characteristic point. The field can be a hash value. If the characteristic point is set to be a fixed point, the step can be skipped, namely the timestamp is unnecessary to be recorded.

Optionally, the audio fingerprint extraction method further includes adding an audio signal mark field configured for recording ID mark information of an audio signal corresponding to the audio fingerprint. The field can be a hash value.

Optionally, the audio fingerprint extraction method further includes dividing the audio signal into several sections of audio sub-signals; according to the steps of aforementioned method, extracting the audio fingerprint from each section of sub-signal to obtain several audio fingerprints; and combining audio fingerprints of each of the characteristic points of the extracted sections of sub-signal to obtain the audio fingerprint of the entire section of audio signal.

As an optional example, during a process of searching and identifying the audio by the audio fingerprints extracted according to the disclosure, when a distance between two audio fingerprints such as a Hamming distance is calculated, aiming at each audio fingerprint bit, weighting utilizing the corresponding weight bit, the weight of a strong bit is high, and the weight of a weak bit is low, or the weight of the weak bit can be set to be zero, which can weaken or eliminate the weight of the weak bit to render the audio research to be more robust to noises, resulting in effectively resolving the problem of noise error rate.

The Hamming distance is a common measurement in the realm of information theory. The Hamming distance between two character strings with the same length is the quantity of different characters of the corresponding position of two character strings. When the Hamming distance is calculated, the two character strings can be calculated by the exclusive OR operation, and the amount of 1 acting as a result is counted, which is the Hamming distance.

Figure 2:
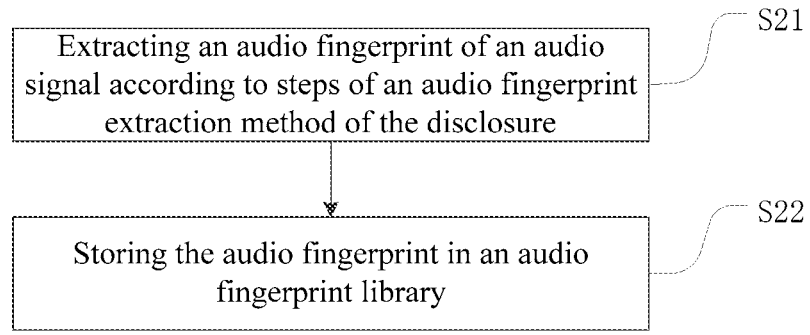
FIG. 2 is a schematic flowchart of an audio fingerprint library construction method of an embodiment of the disclosure.

FIG. 2 is a schematic flowchart of an audio fingerprint library construction method of an embodiment of the disclosure. Referring to FIG. 2, the audio fingerprint library construction method of the disclosure mainly includes following steps.

Step S21, an audio fingerprint of an audio signal is extracted according to the steps of the audio fingerprint extraction method of the aforementioned of the disclosure. Then the process will advance to step S22.

Step S22, the obtained audio fingerprint of the audio signal is stored in the audio fingerprint library.

It needs to illustrate that the higher amount of audio signals, the more abundant of information stored in the audio fingerprint library will be. Moreover, as time goes on, the audio fingerprint library can be updated accordingly.

Figure 3:
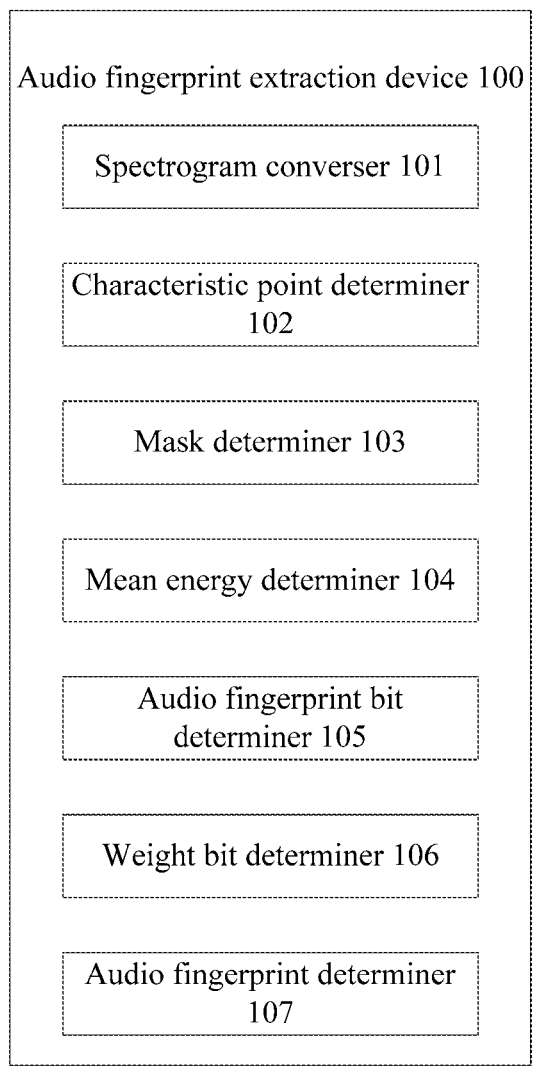
FIG. 3 is a structural block diagram of an audio fingerprint extraction device of an embodiment of the disclosure.

FIG. 3 is a structural bin diagram of an audio fingerprint extraction device of an embodiment of the disclosure. Referring to FIG. 3, an audio fingerprint extraction device 100 of the disclosure primarily includes a spectrogram converter 101, a characteristic point determiner 102, a mask determiner 103, a mean energy determiner 104, an audio fingerprint bit determiner 105, a weight bit determiner 106 and an audio fingerprint determiner 107.

The spectrogram converter 101 is configured for converting an audio signal to a spectrogram. The spectrogram converter 101 can be specifically configured for converting the audio signal to a time-frequency spectrogram by the fast Fourier transformation.

In an embodiment of the disclosure, the spectrogram converser 101 can include an MEL sub-converser configured for pre-processing the spectrogram by the MEL conversion. The spectrogram can be divided into several frequency bins by the MEL conversion; and the amount of divided frequency bins can be disposed. Moreover, the spectrogram converser 101 can further include a human auditory system sub-filter configured for processing the spectrogram by the human auditory system filtering, which utilizes nonlinear transformations such as the human auditory system filtering to better fit the spectral distribution in the spectrogram to the ear perception.

The characteristic point determiner 102 can be configured for determining characteristic points in the spectrogram.

Specifically, the characteristic point determiner 102 can specifically configured for adopting one of various standards to determine the characteristic point. For instance, the characteristic point can be a maximal energy point in the spectrogram, or a minimal energy point in the spectrogram.

In an embodiment of the disclosure, the characteristic point determiner 102 can further select a fixed point other than the extreme energy points as the characteristic point, such as a point whose frequency is equal to a presupposed frequency value (a point with a fixed frequency). Furthermore, the characteristic point determiner 102 can be configured for selecting several frequency values of low frequency, intermediate frequency and high frequency based on frequency values; concrete values of the low frequency, intermediate frequency and high frequency can be disposed.

The mask determiner 103 is configured for determining one or more masks around the characteristic point on the spectrogram for the characteristic point. Each mask includes several spectrum regions. Specifically, in the spectrogram, multiple spectrum regions contained in each mask can be symmetrically distributed.

The mean energy determiner 104 is configured for respectively determining mean energy of each spectrum region.

The audio fingerprint bit determiner 105 is configured for determining an audio fingerprint bit according to the mean energy of multiple spectrum regions in a mask.

In the embodiment of the disclosure, the audio fingerprint bit determiner 105 can specifically configured for determining an audio fingerprint bit according to a difference value of mean energy of multiple spectrum regions contained in a mask.

The weight bit determiner 106 is configured for judging credibility of an audio fingerprint bit to determine a weight bit corresponding to each audio fingerprint bit.

In an embodiment of the disclosure, if the audio fingerprint bit is determined according to the difference value of mean energy of multiple spectrum regions contained in the mask, the weight bit determiner 106 is specifically configured for judging whether an absolute value of the difference value used to generate the audio fingerprint bit attains or exceeds a presupposed weight bit threshold; if it attains the weight bit threshold, the audio fingerprint bit is determined to be a strong bit, and acquires a weight bit whose value is 1; if it fails to attain the weight bit threshold, the audio fingerprint bit is determined to be a weak bit, and acquires a weight bit whose value is 0.

The audio fingerprint determiner 107 is configured for combining the obtained numerous audio fingerprint bits and weight bits to acquire the audio fingerprint.

Optionally, the audio fingerprint extraction device 100 further includes a timestamp adder (not shown in figures) configured for adding a timestamp field to the audio fingerprint representing a time difference field of audio start position and the characteristic point; the field can be a hash value. If the characteristic point is set to be a fixed point, the timestamp adder can be excluded.

Optionally, the audio fingerprint extraction device 100 further includes an audio signal identification adder (not shown in figures) configured for adding an audio signal mark field for recording ID mark information of the audio signal corresponding to the audio fingerprint.

Optionally, the audio fingerprint extraction device 100 further includes an audio divider (not shown in figures) and an audio fingerprint combiner (not shown in figures). The audio divider is configured for dividing the audio signal into multiple sections of audio sub-signals based on time. The audio fingerprint can be extracted from each section of audio sub-signals by modules contained in the audio fingerprint extraction device to obtain several audio fingerprints. The audio fingerprint combiner is configured for combining audio fingerprints of each characteristic point of each section of extracted audio sub-signals to obtain the audio fingerprint of the entire section of audio signal.

Figure 4:
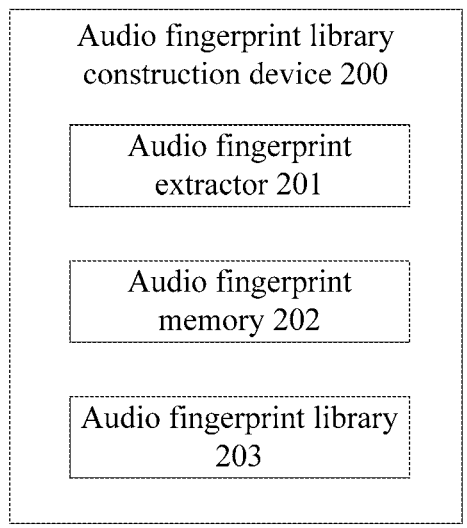
FIG. 4 is a structural block diagram of an audio fingerprint library construction device of an embodiment of the disclosure.

FIG. 4 is a schematic structural view of an audio fingerprint library construction device of the disclosure. Referring to FIG. 4, an audio fingerprint library construction device 200 of the disclosure mainly includes an audio fingerprint extractor 201, an audio fingerprint memory 202 and an audio fingerprint library 203.

The audio fingerprint extractor 201 includes the spectrogram converser 101, the characteristic point determiner 102, the mask determiner 103, the mean energy determiner 104, the audio fingerprint bit determiner 105, the weight bit determiner 106 and the audio fingerprint determiner 107, which follow the steps of the audio fingerprint extraction method of the disclosure to extract the audio fingerprint of the audio signal as described above.

The audio fingerprint memory 202 is configured for storing the audio fingerprint of the audio signal obtained by the audio fingerprint extractor 201 in the audio fingerprint library 203.

The audio fingerprint library 203 is configured for storing the audio fingerprint of each audio signal.

Figure 5:
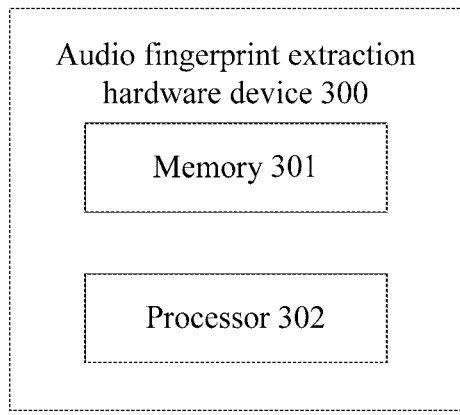
FIG. 5 is a hardware block diagram of an audio fingerprint extraction hardware device of an embodiment of the disclosure.

FIG. 5 is a hardware block diagram of an audio fingerprint extraction hardware device of an embodiment of the disclosure. As shown in FIG. 5, an audio fingerprint extraction hardware device 300 according to the embodiment of the disclosure includes a memory 301 and a processor 302. Components in the audio fingerprint extraction hardware device 300 are mutually connected by a bus system and/or other forms of connectors (not shown).

The memory 301 is configured for storing non-transitory computer readable instructions. Specifically, the memory 301 can include one or more computer programs. The computer programs can include various forms of computer readable storage medium, such as a volatile memory and/or a non-volatile memory. The volatile memory can include a random-access memory (RAM) and/or a cache. The non-volatile memory can include a read only memory (ROM), a hard disk, a flash, etc.

The processor 302 can be a central processing unit (CPU) or other forms of processors with abilities to process data and/or execute instructions, as well as controlling other components in the audio fingerprint extraction hardware device 300 to provide expected functions. In an embodiment of the disclosure, the processor 302 is configured for running the computer readable instructions stored in the memory 301, so that the audio fingerprint extraction device 300 performs all or a part of steps of the audio fingerprint extraction method of each embodiment of the disclosure.

Figure 6:
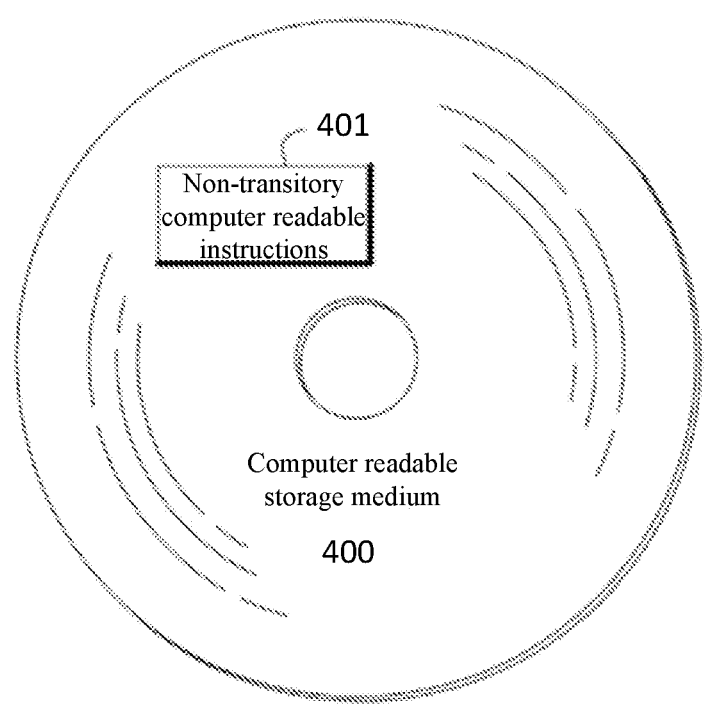
FIG. 6 is a schematic view of a computer readable storage medium of an embodiment of the disclosure.

FIG. 6 is a schematic view of a computer readable storage medium of an embodiment of the disclosure. As shown in FIG. 6, a computer readable storage medium 400 according to the embodiment of the disclosure stores non-transitory computer readable instructions 401. When the non-transitory computer readable instructions 401 are operated by a processor, all or a part of steps of the audio fingerprint extraction method of each embodiment of the disclosure will be executed.

Figure 7:
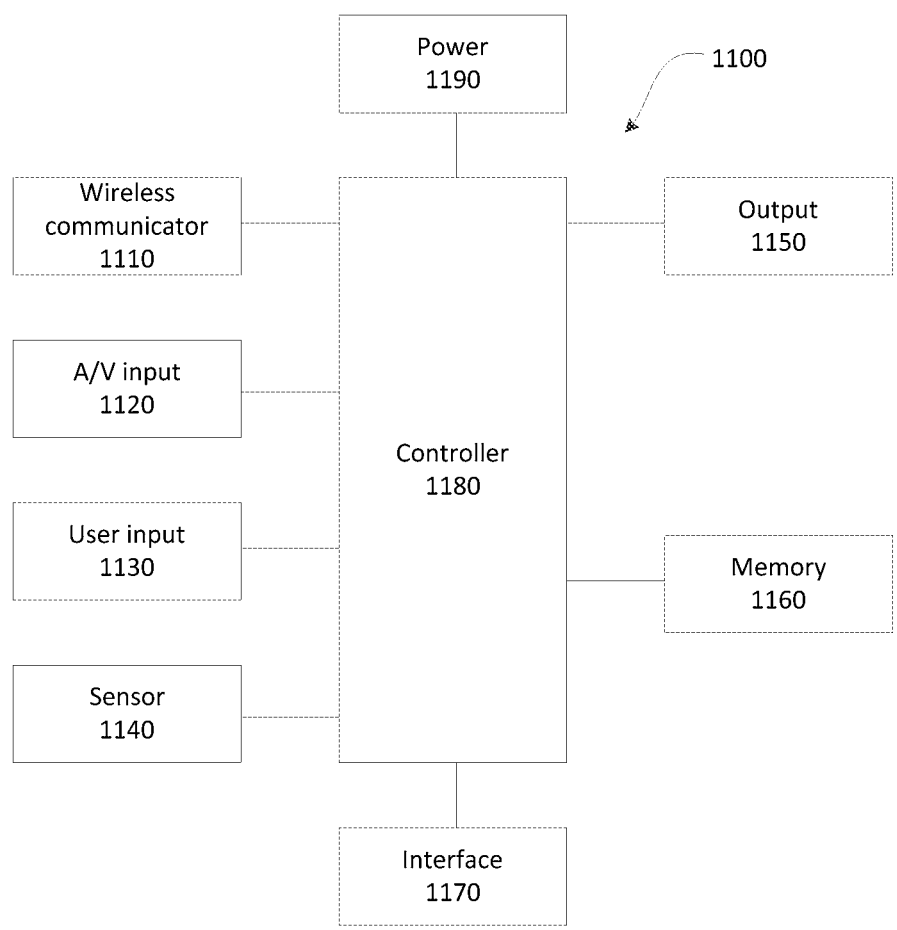
FIG. 7 is a structural block diagram of terminal device of an embodiment of the disclosure.

FIG. 7 is a structural block diagram of terminal device of an embodiment of the disclosure. The terminal device can be implemented in various forms. The terminal device in the disclosure can include but not limit to a mobile terminal device such as a mobile phone, a smart phone, a laptop, a digital broadcast receiver, a personal digital assistant (PDA), a pad, a portable multimedia player (PMP), a navigation device, a vehicle terminal device, a vehicle display terminal and a vehicle digital rearview mirror, and a fixed terminal device such as a digital TV, a computer and so on.

As shown in FIG. 7, a terminal device 1100 can include a wireless communicator 1110, an audio/video (A/V) input 1120, a user input 1130, a sensor 1140, an output 1150, a memory 1160, an interface 1170, a controller 1180 and a power 1190. FIG. 7 shows a terminal device with various components, but it is understood that not all components are required to be included; more or less components can be implemented instead.

The wireless communicator 1110 permits the radio communication between the terminal device 1100 and a wireless communication system or network. The A/V input 1120 is configured for receiving audio or video signals. The user input 1130 can input data according to a command generator input by a user to control various operations of the terminal device. The sensor 1140 detects the current state of the terminal device 1100, a position of the terminal device 1100, a touch input from a user to the terminal device 1100, the orientation of the terminal device 1100, accelerating or decelerating movement and direction of the terminal device 1100, and generates a command or signal configured for controlling operations of the terminal device 1100. The interface 1170 acts as an interface that at least one external device and terminal device 1100 can go through. The output 1150 is formed to provide output signals in visual, audio and/or touch manners. The memory 1160 can store software programs processed and controlled by the controller 1180, or temporarily store output data or data to be output. The memory 1160 can include at least one type of storage medium. And the terminal device 1100 can cooperate with a web storage device connected with the memory 1160 over the network to perform the storing function. The controller 1180 generally controls the overall operation of the terminal device. Moreover, the controller 1180 can include a multimedia module configured for re-presenting or re-playing multimedia data. The controller 1180 can execute a pattern recognition process to recognize hand input or image drawing input on the touch screen to be a character or an image. The power 1190 receives external electricity or internal electricity governed by the controller 1180 and provides proper electricity to manipulate each component and element.

Various embodiments of the audio fingerprint extraction method provided by the disclosure can be implemented by computer software, hardware or computer readable medium of any combination. With respect to the hardware execution, various embodiments of the audio fingerprint extraction method provided by the embodiments of the disclosure can be processed by at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor and an electrical unit designed for executing the functions described herein. In some cases, each embodiment of the audio fingerprint extraction method provided by the disclosure can be performed in the controller 1180. With respect to software execution, various embodiments of the audio fingerprint extraction method provided by the embodiments of the disclosure can be performed with an individual software module allowing at least one function or operation. The software codes can be implemented by a software application program written by any proper programming language. The software codes can be stored in the memory 1160 and performed by the controller 1180.

According to the audio fingerprint extraction method, device, hardware device, computer readable storage medium and terminal device of the embodiments of the disclosure, the audio fingerprint bit is extracted by the mask, and the corresponding weight bit is extracted, which can significantly enhance the accuracy of audio fingerprint extraction and efficiency of extraction, and generate the audio fingerprint with superior audio fingerprint with excellent robustness for the audio signal. As a result, the audio comparison, audio search, audio deduplication and audio surveillance obtained by the audio fingerprint extraction method based on the disclosure can have the higher accuracy, the higher efficiency and better robustness.

The fundamental principle of the disclosure is described incorporated with concrete embodiments; however, it needs to point out that advantages, superiorities and effects mentioned in the disclosure merely are examples rather than limitation; it is unreasonable to regard the advantages, superiorities and effects as requisite. Moreover, the foregoing disclosed concrete details only are exemplary for better understanding rather than limitation. The foregoing details will not restrict the disclosure to employ the detail above.

Block diagrams of elements, devices, facilities and systems in the disclosure are only exemplary example without intending or implying to connect, arrange or dispose strictly according to the method shown in the block diagrams. The elements, devices, facilities and systems can be connected, arranged or disposed in any manner known by a person skilled in the art. Words such as "comprise", "include" and "have" are unrestricted words, which indicate "include without excluding", capable of mutual substitution. Words "or" and "and" depict "and/or", which can mutually substitute, unless otherwise specified. The word "such as" indicates the phrase "such as but not limit to", which can be mutually substituted.

Furthermore, "or" used in a list starting with "at least one" indicates discrete examples, so that "at least one of A, B or C" means A or B or C, or AB or AC or BC, or ABC (namely A and B and C). Moreover, the expression "exemplary" does not mean the example to be preferred or better than other examples.

It needs to point out that each component or each step can be divided and/or re-assorted in the system and method of the disclosure. The division and/or re-association should be regarded as equivalence to the disclosure.

The technology defined by the claims can be modified, replaced and altered. Moreover, the range of the claims of the disclosure is unrestricted to specific aspects of combination, manners, methods and operations of foregoing processes, apparatuses, fabrication and events. The almost same function or result can be achieved by utilizing the combination, manners, methods and operations of foregoing processes, apparatuses, fabrication and events. Therefore, the attached claims include the combination, manners, methods and operations of foregoing processes, apparatuses, fabrication and events.

The disclosed aspects provided as above enable a person skilled in the art to attain or use the disclosure. Various modifications are obvious to a person skilled in the art, and a general principle defined herein can be applied to other aspects without exceeding the range of the disclosure. Therefore, the disclosure does not intend to be restricted to the shown aspects, which can cover the widest range according to the disclosed principle and novel features.

The description above is provided for a purpose of illustration. Moreover, the description does not intend to restrict embodiments of the disclosure as the disclosed forms. Although multiple examples and embodiments are debated, but a person skilled in the art is able to acquire some modification, alteration, transformation, addition and sub-combination.

The invention claimed is:

1. An audio fingerprint extraction method, comprising:
   converting an audio signal to a spectrogram;
   determining one or more characteristic points in the spectrogram;
   in the spectrogram, determining one or more masks for the one or more characteristic points; wherein each of the one or more masks comprise a plurality of spectrum regions;
   determining mean energy of each of the plurality of spectrum regions;
   determining one or more audio fingerprint bits according to the mean energy of the plurality of spectrum regions in the one or more masks;
   judging credibility of the one or more audio fingerprint bits to determine one or more weight bits;
   combining the one or more audio fingerprint bits and the one or more weight bits to obtain an audio fingerprint;
   wherein the plurality of spectrum regions comprised in the one or more masks are symmetrical distributed; and
   wherein the plurality of spectrum regions comprised in the one or more masks have an identical frequency range, and/or an identical time range, and/or are centrosymmetric with the characteristic point as a center.

2. The audio fingerprint extraction method according to claim 1, wherein the converting an audio signal to a spectrogram comprises: converting the audio signal to a two-dimensional time-frequency spectrogram by fast Fourier transformation; wherein a value of each point in the spectrogram indicates energy of the audio signal.

3. The audio fingerprint extraction method according to claim 2, wherein the converting an audio signal to a spectrogram further comprises: processing the spectrogram by MEL transformation.

4. The audio fingerprint extraction method according to claim 2, wherein the converting an audio signal to a spectrogram further comprises: processing the spectrogram by human auditory system filtering.

5. The audio fingerprint extraction method according to claim 2, wherein each of the one or more characteristic points is a fixed point in the spectrogram.

6. The audio fingerprint extraction method according to claim 5, wherein each of the one or more characteristic points is a point whose frequency is equal to one of a plurality of pre-set frequency values.

7. The audio fingerprint extraction method according to claim 2, wherein each of the one or more characteristic points is a maximal energy point in the spectrogram, or each of the one or more characteristic points is a minimal energy point in the spectrogram.

8. The audio fingerprint extraction method according to claim 1, wherein the mean energy of each of the plurality of spectrum regions is a mean value of energy values of all points comprised in the spectrum region.

9. The audio fingerprint extraction method according to claim 1, wherein the determining one or more audio fingerprint bits according to mean energy of the plurality of spectrum regions in the one or more masks comprises:
   determining one of the one or more audio fingerprint bits according to a difference value of the mean energy of the plurality of spectrum regions comprised in one mask.

10. The audio fingerprint extraction method according to claim 9, wherein the judging credibility of the one or more audio fingerprint bits to determine one or more weight bits comprises:
    judging whether an absolute value of the difference value attains or exceeds a pre-set weight bit threshold, if it attains or exceeds the pre-set weight bit threshold, determining the audio fingerprint bit to be a strong bit, otherwise determining the audio fingerprint bit to be a weak bit; determining the weight bit according to the audio fingerprint bit is the strong bit or the weak bit.

11. The audio fingerprint extraction method according to claim 10, wherein the weight bit threshold is a fixed value, or a value based on the difference value, or a scale value.

12. The audio fingerprint extraction method according to claim 1, wherein the audio fingerprint extraction method further comprises:
    dividing the audio signal into a plurality of audio sub-signals according to time;
    extracting the audio fingerprints of the plurality of audio sub-signals; and
    combining the audio fingerprints of the plurality of audio sub-signals to obtain the audio fingerprint of the audio signal.

13. The audio fingerprint extraction method according to claim 1, wherein after combining the one or more audio fingerprint bits and the one or more weight bits to obtain an audio fingerprint, the audio fingerprint extraction method further comprises:
    storing the audio fingerprint in an audio fingerprint library.

14. An audio fingerprint extraction device, comprising:
    a processor; and a memory communicatively coupled to the processor and storing executable instructions that upon execution by the processor cause the processor to perform operations, the operations comprising:
converting an audio signal to a spectrogram;
determining one or more characteristic points in the spectrogram;
in the spectrogram, determining one or more masks for the one or more characteristic points; wherein each of the one or more masks comprise a plurality of spectrum regions;
determining mean energy of each of the plurality of spectrum regions;
determining one or more audio fingerprint bits according to the mean energy of the plurality of spectrum regions in the one or more masks;
judging credibility of the one or more audio fingerprint bits to determine one or more weight bits;
combining the one or more audio fingerprint bits and the one or more weight bits to obtain an audio fingerprint;
wherein the plurality of spectrum regions comprised in the one or more masks are symmetrical distributed; and
wherein the plurality of spectrum regions comprised in the one or more masks have an identical frequency range, and/or an identical time range, and/or are centrosymmetric with the characteristic point as a center.

15. The audio fingerprint extraction device according to claim 14, wherein the mean energy of each of the plurality of spectrum regions is a mean value of energy values of all points comprised in the spectrum region.

16. The audio fingerprint extraction device according to claim 14, wherein the determining one or more audio fingerprint bits according to mean energy of the plurality of spectrum regions in the one or more masks comprises:
determining one of the one or more audio fingerprint bits according to a difference value of the mean energy of the plurality of spectrum regions comprised in one mask.

17. The audio fingerprint extraction device according to claim 16, wherein the judging credibility of the one or more audio fingerprint bits to determine one or more weight bits comprises:
judging whether an absolute value of the difference value attains or exceeds a pre-set weight bit threshold, if it attains or exceeds the pre-set weight bit threshold, determining the audio fingerprint bit to be a strong bit, otherwise determining the audio fingerprint bit to be a weak bit; determining the weight bit according to the audio fingerprint bit is the strong bit or the weak bit.

18. A non-transitory computer readable storage medium, configured for storing computer readable instructions that upon execution; by a computer cause the computer to perform operations, the operations comprising:
converting an audio signal to a spectrogram;
determining one or more characteristic points in the spectrogram;
in the spectrogram, determining one or more masks for the one or more characteristic points; wherein each of the one or more masks comprise a plurality of spectrum regions;
determining mean energy of each of the plurality of spectrum regions;
determining one or more audio fingerprint bits according to the mean energy of the plurality of spectrum regions in the one or more masks;
judging credibility of the one or more audio fingerprint bits to determine one or more weight bits;
combining the one or more audio fingerprint bits and the one or more weight bits to obtain an audio fingerprint;
wherein the plurality of spectrum regions comprised in the one or more masks are symmetrical distributed; and
wherein the plurality of spectrum regions comprised in the one or more masks have an identical frequency range, and/or an identical time range, and/or are centrosymmetric with the characteristic point as a center.

* * * * *